March 2, 1954 D. D. HULL 2,670,542
ADJUSTABLE HEIGHT GAUGE
Filed Oct. 19, 1951 3 Sheets-Sheet 1
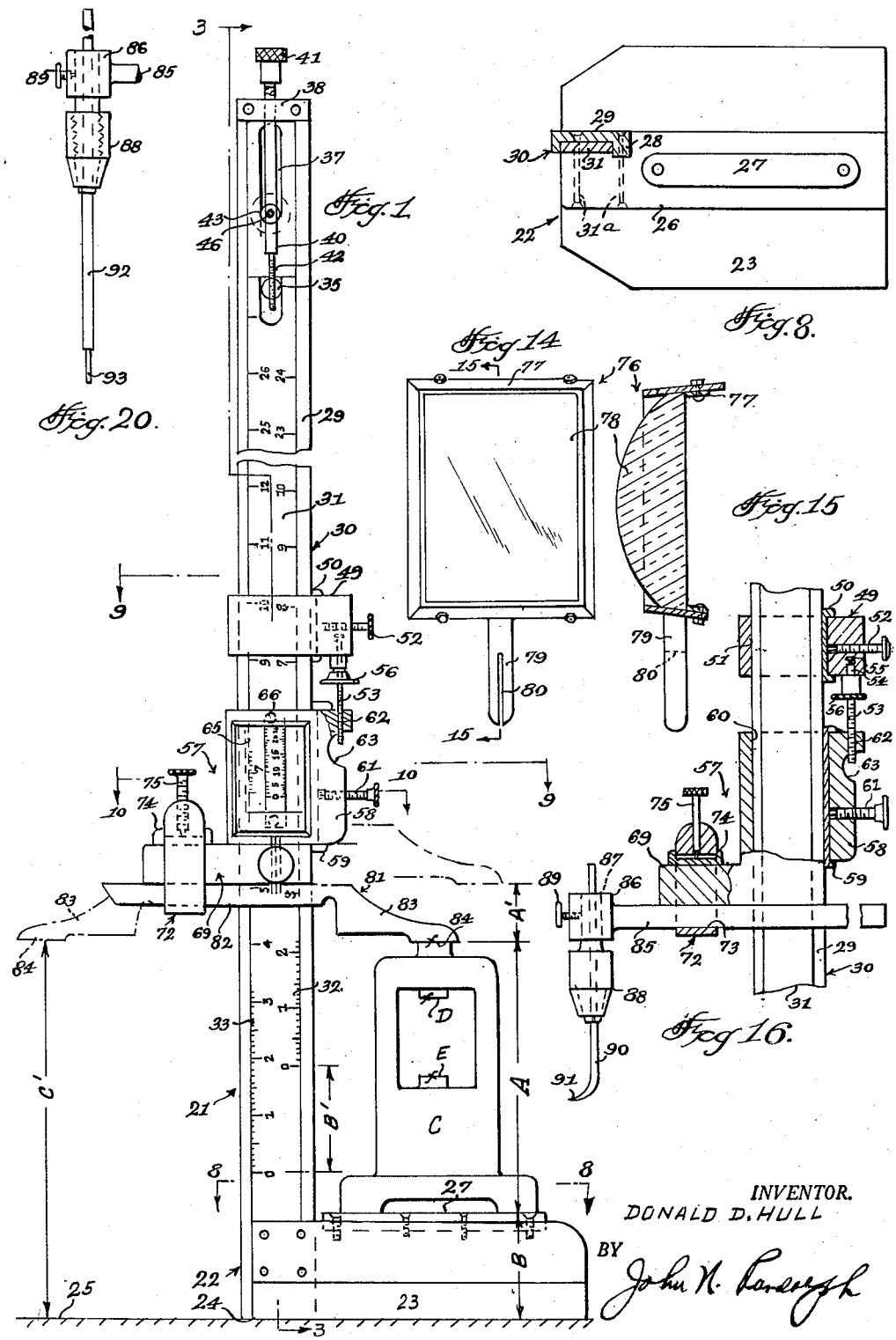
INVENTOR.
DONALD D. HULL
BY

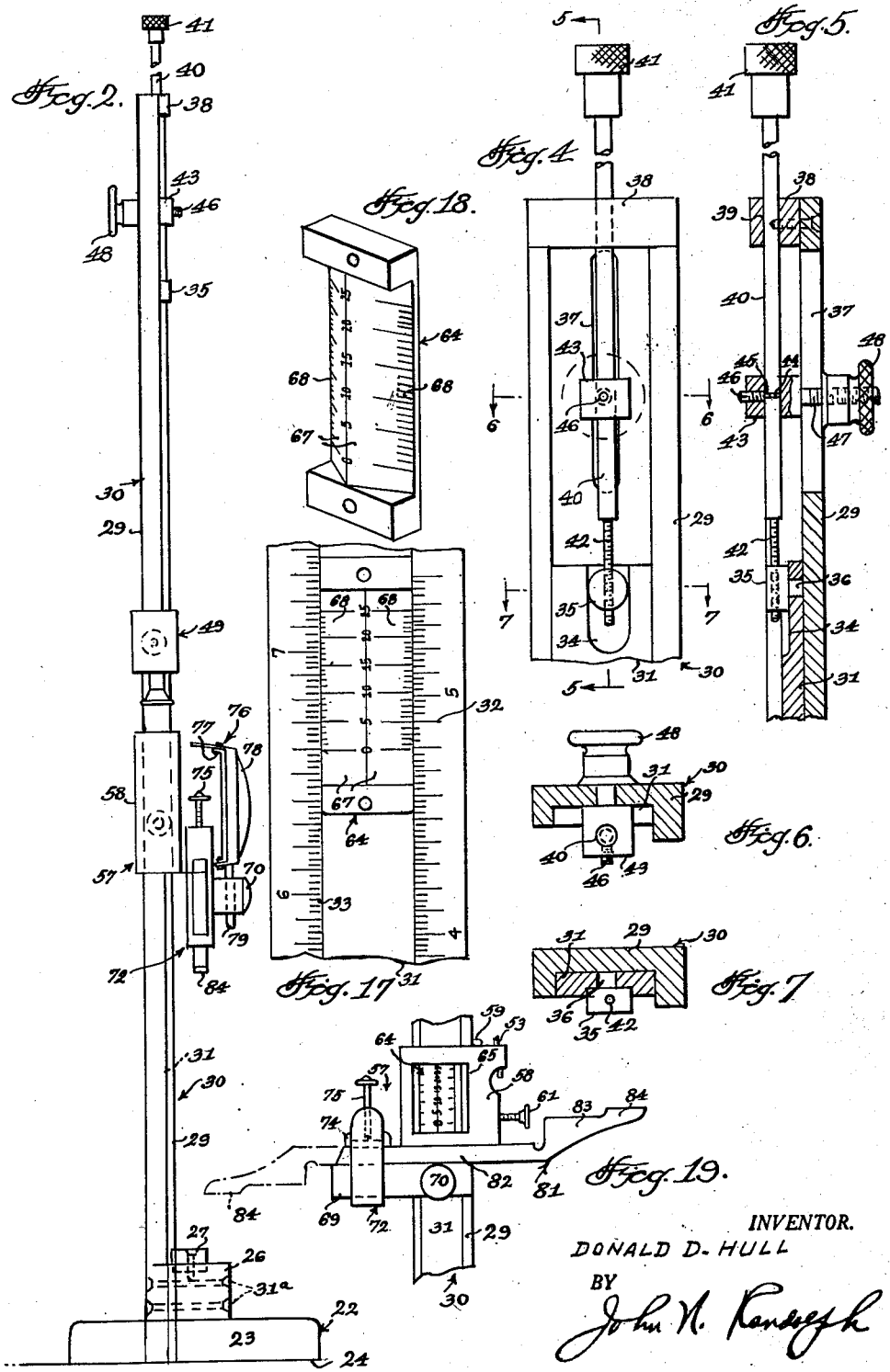

March 2, 1954  D. D. HULL  2,670,542
ADJUSTABLE HEIGHT GAUGE
Filed Oct. 19, 1951  3 Sheets-Sheet 3
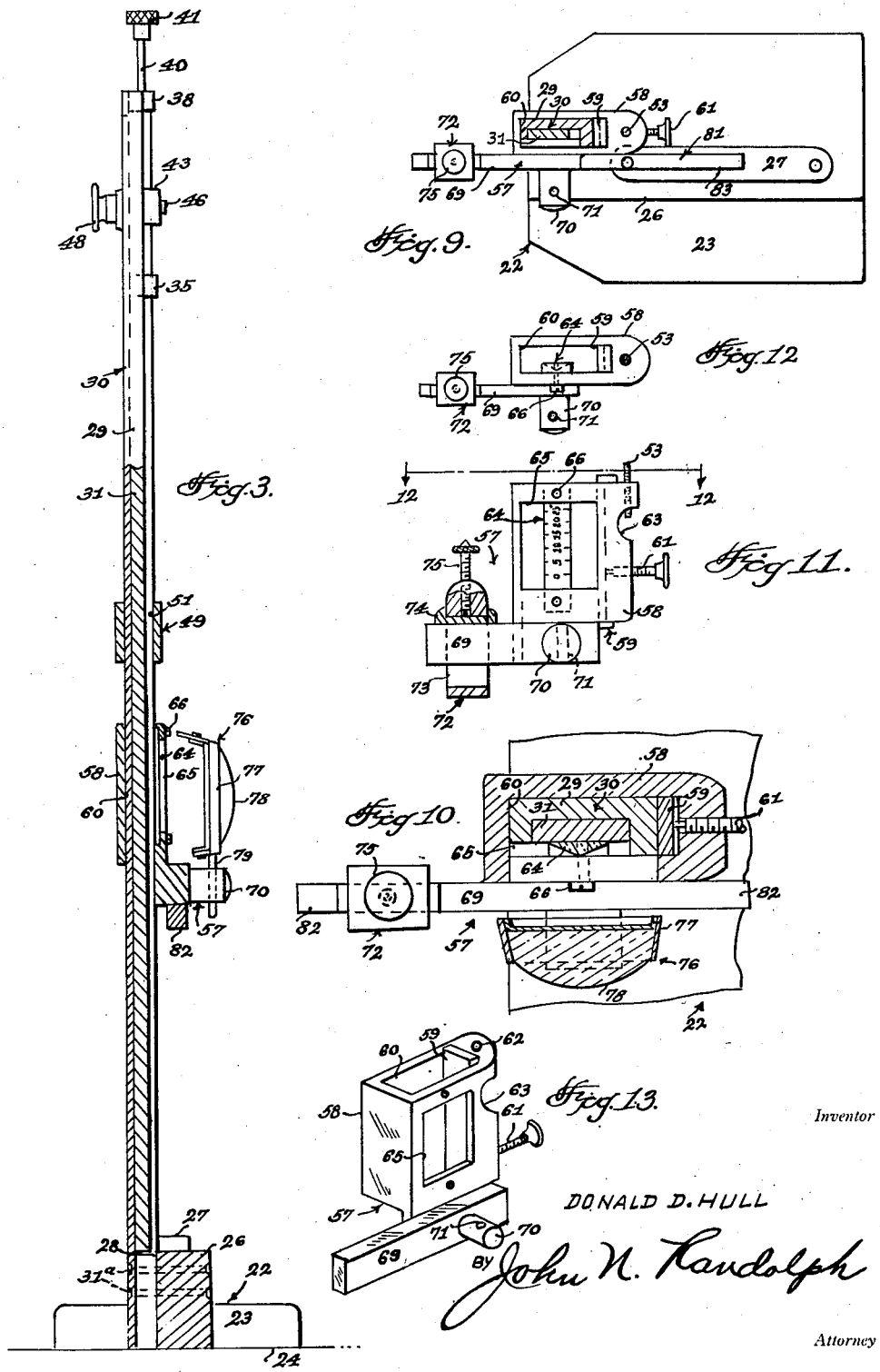
Inventor
DONALD D. HULL
By John N. Randolph
Attorney Patented Mar. 2, 1954

2,670,542

UNITED STATES PATENT OFFICE 2,670,542

ADJUSTABLE HEIGHT GAUGE

Donald D. Hull, Jackson, Mich.

Application October 19, 1951, Serial No. 252,140

2 Claims. (Cl. 33—169)

This invention relates to a novel construction of height-gauge for use in securing accurate measurements of elements and which is capable of being readily adjusted and set for obtaining either inside or outside measurements with respect to either a flat level surface on which the gauge is supported or relatively to an anvil surface of the gauge where a flat, level gauge supporting surface is not available.

Another object of the invention is to provide a height gauge having a vertically adjustable scale bar having sets of linear graduations and indicia for use with adjustable elements of the gauge for obtaining either inside or outside measurements relatively to a supporting surface of the gauge or relatively to the anvil surface of the gauge.

Still a further object of the invention is to provide a height gauge including attachments capable of being readily applied thereto for use either in ordinary checking or layout work, in restricted spaces, as an accurate inscriber, or to enable the gauge to be utilized as a depth gauge.

Still another object of the invention is to provide a height gauge including a vernier scale with magnifying means to enable measurements to be accurately obtained and read to thousandths of an inch.

Various other objects and advantages of the invention will hereinafter become more fully apparent from the following description of the drawings, illustrating a presently preferred embodiment thereof, and wherein:

Figure 1 is a front elevational view showing the gauge in an operative position;

Figure 2 is an edge elevational view of the gauge look from left to right of Figure 1;

Figure 3 is a vertical sectional view, partly in side elevation, taken substantially along a plane as indicated by the line 3—3 of Figure 1;

Figure 4 is an enlarged fragmentary front elevational view of the upper portion of the gauge;

Figure 5 is a vertical sectional view taken substantially along a plane as indicated by the line 5—5 of Figure 4;

Figures 6 and 7 are horizontal, cross sectional views taken substantially along planes as indicated by the lines 6—6 and 7—7, respectively, of Figure 4;

Figures 8 and 9 are horizontal sectional views taken substantially along planes as indicated by the lines 8—8 and 9—9, respectively, of Figure 1;

Figure 10 is an enlarged horizontal sectional view taken substantially along a plane as indicated by the line 10—10 of Figure 1;

Figure 11 is a front elevational view, partly in vertical section of a part of the height gauge;

Figure 12 is a top plan view thereof taken substantially along a plane as indicated by the line 12—12 of Figure 11;

Figure 13 is a perspective view of the slide of Figures 11 and 12;

Figure 14 is a front elevational view of the magnifying unit;

Figure 15 is a vertical sectional view thereof taken substantially along a plane as indicated by the line 15—15 of Figure 14;

Figure 16 is a vertical sectional view, partly in front elevation illustrating the use of an attachment of the gauge;

Figure 17 is a fragmentary front elevational view on an enlarged scale illustrating the relationship of the slidably movable vernier with respect to the vertically adjustable scale bar;

Figure 18 is an enlarged perspective view of the vernier;

Figure 19 is a fragmentary vertical sectional view illustrating other positions of the gauge arm as supported by the slide unit, and Figure 20 is a fragmentary side elevational view showing a depth gauge attachment substituted for the scriber attachment of Figure 16.

Referring more specifically to the drawings, the novel height gauge in its entirety is designated generally 21 and includes a base, designated generally 22 having a relatively wide bottom portion 23 the under surface 24 of which is flat and adapted to rest on a suitable supporting surface 25. The base 22 also includes an elongated relatively narrow bar 26 which is suitably secured to the base portion 23 intermediate of its side edges and which extends from end-to-end thereof. The bar 26 has an elongated strip 27 disposed on and secured to the upper surface of said bar. The upper surface of the strip 27, which forms an anvil, is disposed parallel to the bottom surface 24 of the base. The anvil 27 is spaced from one end of the bar 26, which end has a recess in one side thereof, as seen at 28 in Figure 8, to accommodate therein the lower end of a channel section 29 of a standard, designated generally 30. Said lower end of the channel section 29 is secured rigidly to the bar 26 by suitable fastenings 31a and is thus supported by the base 22 in an upright position perpendicular to the bottom surface 24 and to the upper surface of the anvil 27.

The standard 30 also includes an elongated bar or strip 31 which is slidably disposed in the channel of the section 29. The exposed side of the bar 31 is provided with two linear scales 32 and 33, one of which is disposed adjacent each longitudinal edge thereof and each of which includes graduations and indicia for reading measurements in inches and fractions thereof. Furthermore, as noted in Figure 1, the "0" inch graduations of the two scales 32 and 33 are offset with respect to one another a distance corresponding to the distance between the bottom base surface 24 and the upper surface of the anvil 27, for a purpose which will hereinafter become apparent. As best seen in Figures 4 to 7, the upper end of the bar 31 is provided on its outer side with a longitudinally extending recess 34 in which is partially received a nut 35 having a stem 36 extending inwardly therefrom and which is anchored in the bar 31, as illustrated in Figure 5. The bar 31 terminates below the upper end of the channel member 29 and the intermediate or back portion of said channel member, above the bar 31, is provided with a vertically elongated slot 37. A head or block 38 is secured in and closes the upper end of the channel 29 and is provided with a bore 39 forming a guide and journal for an elongated stem 40. The stem 40 has a knurled head 41 on its upper end disposed above the standard 30 and has a restricted threaded shank portion 42 at its lower end. The intermediate portion of the stem 40 is journalled in a bearing 43 and said intermediate portion includes a restricted portion 44 in which is received a restricted end 45 of a setscrew 46 which is threaded radially into the bearing 43. The bearing 43 is provided with a shank 47 which extends outwardly through the slot 37 and the terminal portion of which is threaded to receive a nut 48. The nut 48 is adapted to be tightened for clamping the bearing 43 in various vertically adjusted positions in the channel section 29 and it will be readily apparent when the nut 48 is loosened, the stem 40 can be vertically reciprocated in the guide block 38 to cause the bearing 43 to slide vertically therewith. Likewise, the bar 31 will be vertically reciprocated with the stem 40 since the threaded shank 42 threadedly engages the nut 35 to thus connect the stem 40 and bar 31. In this manner, rough vertical adjustment of the bar 31 may be made relatively to the channel 29 and thus relatively to the base 22, after which the nut 48 can be tightened to clamp the bearing 43 against vertical sliding movement and the stem 40 is then rotated by its knurled thumb knob 41 to cause the shank 42 to be moved either downwardly or upwardly through the nut 35 to thereby raise or lower, respectively, the bar 31 to thus obtain fine adjustment of the bar.

An upper supporting slide 49 is mounted for vertical reciprocating movement on the standard 30 and has a wedge block 50 disposed in one end of the bore 51 thereof and which engages one side of the channel section 29. A screw 52 is threaded into the slide 49 against the wedge block 50 and is adapted to be advanced inwardly to force the wedge block into clamping engagement with the standard 30, as best illustrated in Figure 16, for adjustably clamping the slide 49 to the standard at any desired level. A screw 53 has an unthreaded upper end 54 which is journalled in a portion of the slide 49 and which is rotatably connected thereto by a pin and groove connection 55. The screw 53 is provided with a knurled head 56 beneath said upper end 54 and above its threaded portion.

A movable gauge element carrying unit, designated generally 57, includes an elongated slide 58 which is reciprocally supported on the standard 30 below the supporting slide 49 and which likewise includes a wedge block 59 which is disposed in the bore 60 thereof. The block 59 is likewise displaced into clamping engagement with a side of the channel section 29 by a screw 61 which is threaded into the slide 58 and which engages the block 59 for clamping the slide to the standard 30 when the screw 61 is advanced inwardly of said slide 58. The upper portion of the slide 58 is provided with a vertically extending threaded bore 62 to receive the screw 53 and said slide 58 is provided with a notch 63, below the bore 62, into which the lower end of the screw 53 can extend. It will be apparent that with both of the screws 52 and 61 loosened the supporting slide 49 and unit 57 may be slid upwardly or downwardly on the standard 30 for obtaining desired rough adjustments. The screw 52 may then be tightened to secure the supporting slide 49 to the standard 30 and by then manually turning the screw 53 by its thumb knob or head 56 fine adjustment of the unit 57 may be accomplished.

The bore 60 is of sufficient depth between the front and rear faces of the slide 58 to accommodate a vernier bar 64 between the bar section 31 and the front portion of the bore 60. The vernier bar 64 is exposed through an opening or window 65 formed in the front face of the slide 58 and is secured by fastenings 66 to said slide, above and beneath the opening 65. The vernier bar 64 is substantially narrower than the bar section 31 and is disposed between the linear scales 32 and 33 thereof. As best seen in Figure 18, the front part of the portion of the vernier bar 64 which is exposed in the opening 65 is provided with two faces 67 which are angularly disposed with respect to one another to form a ridge therebetween and each of which faces 67 is provided with a vernier scale 68. Each vernier scale 68 functions with the scale 32 or 33, located adjacent thereto, as will hereinafter be more fully described.

The unit 57 also includes a bar 69 which is preferably formed integral with the lower end of the slide 58 and which is forwardly offset relatively to the slide bore 60. The bar 69 is disposed transversely of the slide 58 and extends laterally from one side thereof. A stem 70 projects outwardly from the bar 69 and has a bore 71 extending vertically therethrough. The stem 70 is disposed substantially in alignment with the vernier 64, as illustrated in Figures 11 and 12. A sleeve-type clamp 72 is detachably and loosely supported on the laterally projecting outer end of the bar 69 and has an elongated slot 73 therein through which the bar 69 loosely extends. A wedge block 74 is disposed in the upper end of the slot 73 and bears on the upper edge of the bar 69 and is adapted to be displaced downwardly with respect to the slot 73 by a screw 75 which is threaded through the upper portion of the clamp sleeve 72 and which bears against the wedge block 74.

A magnifying unit, designated generally 76, includes a frame 77, formed of detachable sections, in which a magnifying lens 78, preferably of about fifteen power, is detachably mounted. A slotted stem 79 extends downwardly from the bottom of the frame 77 and is insertable downwardly into the vertical bore 71 until the furcations of the stem formed by its downwardly opening slot 80 are wedged in the bore 71 to mount the magnifying unit 76 above the stem 70 and directly in front of the window or opening 65 so that the graduations and indicia visible therethrough may be more accurately and easily read.

A gauge arm, designated generally 81, is detachably supported beneath the bar 69 by the clamp sleeve 72 and includes a bar or shank 82 which is disposed in the bottom portion of the slot 73 beneath the bottom edge of the bar 69. The bar or shank 82 has a downwardly offset portion at one end thereof forming a jaw 83 of the gauge arm 81 and which is provided with a flat bottom surface 84 on its underside forming a movable jaw face of the gauge which is adapted to be disposed above and parallel to the surface 25 and the anvil surface 27 and above either of said surfaces as desired, by reversing the position of the arm 81 as illustrated in full and dotted lines in Figure 1.

Numerous uses for the height gauge 21 will be readily apparent to those skilled in the art. For example, if it is desired to check the measurements of a casting or similar manufactured item such as the casting C, as illustrated in Figure 1, to make sure that the dimensions thereof are within the allowed tolerances, the gauge arm 81 may be applied, as previously described and as illustrated in Figure 1 in full lines and before the casting C is applied to the gauge 21, the screws 52 and 61 may be loosened to allow the slide 49 and unit 57 to slide downwardly until the movable jaw face 84 of the gauge comes to rest on the upper surface of the anvil 27, constituting a stationary jaw face of the gauge. If necessary, the nut 48 may then be loosened to permit the bar section 31 to be slid relatively to the channel section 29 until the "0" graduation of the inside scale 32 of said bar is approximately in alignment with the "0" graduation of the complementary, adjacent scale 68 of the vernier 64. Thereafter, the nut 48 is tightened and the thumb knob 41 may be turned in either direction to accomplish fine adjustment of the bar 31 to bring said "0" graduations into accurate alignment. When this has been accomplished, the scale bar 31 will be correctly set for either inside measurements to be made between the anvil surface 27 and jaw face 84, as illustrated in full lines in Figure 1 on the inside scale 32 in association with the adjacent vernier scale 68, or the scale bar 31 will be correctly set, in the manner previously described, for taking outside measurements between the surface 25 and the dotted line position of the movable jaw face 84, as seen in Figure 1 and wherein a casting or other item to be measured is represented by the arrow tipped line designated C'. For taking outside measurements, the outside scale 33 is utilized with the adjacent vernier scale 68 and since the spacing between the "0" graduations of the two scales is equal to the distance between the surface 25 and the anvil surface 27, both scales 32 and 33 will be accurately "zeroed" by the single adjustment of the bar 31, as previously described.

With the screws 52 and 61 loosened, the supporting slide 49 and the unit 57 may be displaced upwardly until the "0" line of the vernier scale is approximately in line with the graduation of either the scale 32 or the scale 33 representing the nearest fraction of an inch which is obtainable on the scale 32 or 33 to the measurement of the casting C to be made, this figure being obtained from a blueprint or other data against which the actual measurement of the casting is to be checked. Assuming that the over-all height of the casting C should measure 4.778 inches, as represented by the line A in Figure 1, and further assuming that the inside scale 32 is to be used with the gauge arm 81 in its full line position of Figure 1, the "0" graduation of the vernier scale is located approximately in the position as illustrated in Figure 17 or perhaps slightly above this position, to enable the casting C to be positioned between the anvil 27 and the movable jaw face 84. The screw 53 may be manually turned after tightening the clamping screw 52 to anchor the supporting slide 49 to the standard 30, so that the unit 57 which is then supported by the slide 49, may be adjusted vertically on the standard until the jaw face 84 is in contact with the upper surface of the casting C as illustrated in Figure 1. Assuming that the casting is of the exact height as prescribed, the vernier scale 68 of the vernier 64 will be positioned as illustrated in Figure 17 relatively to the inside scale 32. It will be noted that the scale 32 is divided into fortieths of an inch so that the "0" graduation of the vernier scale 68 will be disposed nearest to or slightly above the graduation of the scale 32 representing 4.775 inches. It will also be noted that the two vernier scales 68 are divided into twenty-five equally spaced graduations, every fifth one of which is designated by a longer graduation and a designating number. It will also be noted that the third graduation of the right-hand scale 68, as seen in Figure 17, aligns with a graduation of the scale 32, so that the "0" graduation of the vernier is located $3/25$ the distance between the graduation of the scale 32 representing 4.775 inches and the next graduation thereabove representing 4.8 inches so that the reading 4.778 inches is thus obtained for the height of the casting C. It will thus be obvious that measurements may be accurately obtained to a thousandth of an inch with the gauge 21 and each measurement may be accurately read through the magnifying lens 73 which is disposed directly in front of the vernier 64 and the portions of the scales 32 and 33 located on either side of the vernier. It will likewise be obvious that the same reading could have been obtained in the same manner with the use of the outside scale 33 and with the casting C placed upon the surface 25, assuming that said surface is flat and level.

It will likewise be apparent that other measurements of the casting C may be secured in a like manner between the anvil surface 27 and jaw face 84, as for example the height of the inside surface E of said casting relatively to its bottom surface.

For securing inside measurements, the shank 82 may be secured in an inverted position in the clamp sleeve 72 to position the jaw face 84 in an upwardly facing position and by using a gauge block or model, not shown, having an inside surface of a known height, the scale bar 31 can be adjusted, as previously described, for correctly zeroing its scales to the "0" graduation of the vernier and after such adjustment of the gauge the downwardly facing inside casting surface D may be measured, for example, and the distance between the surfaces D and E thus readily determined in view of the previous determination of the height of the surface E. Likewise, if desired, the clamp sleeve 72 may be displaced upwardly with respect to the bar 69 and the shank 82 then positioned in said sleeve above the bar 69 for securing either outside or inside measurements either with the use of the anvil surface 27 or the supporting surface 25, as indicated in full and dotted lines in Figure 19.

If it is desired to layout the center line, for example, for an opening to be formed in a part of the casting C a certain distance above its bottom surface, the gauge arm 81 may be removed and replaced by a bar 85 which is secured beneath the bar 69 by the clamp 72, as illustrated in Figure 16, in the same manner that the shank 82 is secured to said parts, as previously described and as illustrated in Figure 1. The bar 85 has a vertically disposed sleeve portion 86 at one end thereof in which the tubular shank 87 of a chuck 88 is secured by a setscrew 89 to support the chuck beneath the sleeve 86. A scriber shank 90 is removably disposed in the chuck 88 and secured thereto in a conventional manner and with the scriber point 91 disposed therebeneath. The scale bar 31 may then be adjusted, as previously described to "zero" the scales 32 and 33 with respect to the point 91, as by positioning the point 91 in engagement with the surface 25. A surface of the casting C may then be provided with a temporary coating, as is conventional, and the casting C may be placed on the surface 25 and slid therealong so that the scriber point 91 will inscribe a center line on the coated surface of the casting which may be subsequently used in drilling an opening therein or for any other purpose.

Likewise, the gauge can be set as previously described with a rod 92, as illustrated in Figure 20 secured in the chuck 88 in lieu of the scriber 90, 91 and with the gauge bar 31 zeroed to the lower end 93 of the rod 92, the gauge 21 may be used for measuring the depth of a recess, for example, in a casting, not shown, and the reading thus obtained on the gauge representing the height from the bottom of such recess with respect to either the anvil surface 27 or the surface 25, whichever is being employed.

Numerous other attachments may be utilized with the chuck units of Figures 16 and 20 for adapting the gauge 21 to various other uses which will be readily apparent to those skilled in the art and various other modifications and changes are likewise contemplated and may obviously be resorted to, without departing from the spirit or scope of the invention as hereinafter defined by the appended claims.

I claim as my invention:

1. An adjustable height gauge comprising a base, a standard fixed to and rising perpendicularly from said base including a section rigidly secured to the base and a scale section slidably mounted in said first mentioned, rigid section for reciprocating movement longitudinally of the standard and relatively to the base, said scale section having an exposed side provided with a linear scale including inches and fractions thereof, manually actuated means connecting the standard sections for slidably adjusting the movable scale section relatively to the rigid section and for retaining said sections in adjusted positions, a gauge element carrying unit including a slide reciprocably mounted on the standard, means for clamping said slide to the rigid standard section in various adjusted positions, said scale section of the standard being adjustable relatively to said slide when the latter is clamped to the standard, said slide having a window for exposing a portion of the scale of said scale section, means carried by said slide forming a gauge arm support, said gauge arm support being offset from and extending transversely across a front side of the standard, a gauge arm detachably supported by said means transversely of the standard and having a jaw face constituting a movable gauge jaw, said base having an upwardly facing anvil surface above which said movable jaw face is disposed in one position of mounting of the gauge arm on its supporting means and with said movable jaw face facing either toward or away from said anvil surface for obtaining outside or inside measurements, respectively, of an article mounted on the anvil surface, said gauge arm being adjustably supported by said supporting means outwardly relatively to either side edge of the standard for selectively positioning the jaw face above a flat supporting surface of the base in combination with which said jaw face is adapted to function in its last mentioned position for obtaining measurements of an article supported on the supporting surface of the gauge, and said scale bar being vertically adjustable for zeroing the scale thereof with the slide in either adjusted position of the jaw face.

2. An adjustable height gauge comprising a base having an upwardly facing stationary level surface constituting a supporting surface on which an article to be measured is adapted to rest, an upright standard disposed perpendicular to the supporting surface including a stationary standard section secured rigidly to the base and a movable standard section slidably connected to said stationary standard section for movement longitudinally thereof and relatively to the base, said movable standard section having an exposed face provided with a linear scale, a gauge element carrying unit slidably mounted on said standard, means adjustably clamping said unit to the rigid standard section, a movable gauge element for cooperation with the supporting surface in obtaining measurements between different spaced points on an article supported by the supporting surface, and supporting means carried by the gauge element carrying unit and detachably and adjustably securing said movable gauge element thereto for supporting the movable gauge element in a plurality of positions relatively to the gauge element carrying unit, said means connecting the standard sections comprising a stem rotatably and slidably connected to the stationary standard section and threadedly connected to the movable standard section, a bearing journalling the intermediate portion of said stem to which the stem is rotatably and nonslidably connected, said bearing being slidably connected to the stationary standard section and having means for adjustably clamping it thereto whereby the stem is reciprocated with the bearing relatively to the stationary standard section for accomplishing rough adjustment of the movable standard section and whereby said stem is rotatable in the bearing when the bearing is in a clamped position for accomplishing fine adjustment of the movable standard section relatively to the gauge element carrying unit.

DONALD D. HULL.

References Cited in the file of this patent

UNITED STATES PATENTS

| Number | Name | Date |
|---|---|---|
| D. 131,835 | Messana | Mar. 31, 1942 |
| 1,103,265 | Carff | July 14, 1914 |
| 1,265,431 | Costello | May 7, 1918 |
| 2,028,052 | Easterly | Jan. 14, 1936 |
| 2,306,227 | Seidel | Dec. 22, 1942 |
| 2,346,063 | Bardega | Apr. 4, 1944 |
| 2,353,911 | Leveille | July 18, 1944 |
| 2,412,870 | Champlin | Dec. 17, 1946 |
| 2,465,530 | Gerber | Mar. 29, 1949 |
| 2,468,995 | Morrison | May 3, 1949 |
| 2,519,942 | Fedrick | Aug. 22, 1950 |

FOREIGN PATENTS

| Number | Country | Date |
|---|---|---|
| 77,125 | Switzerland | Dec. 14, 1917 |